United States Patent
Zhou et al.

(10) Patent No.: US 11,778,211 B2
(45) Date of Patent: Oct. 3, 2023

(54) PARALLEL VIDEO PARSING FOR VIDEO DECODER PROCESSING

(71) Applicant: Apple Inc., Cupertino, CA (US)

(72) Inventors: Yaxiong Zhou, Fremont, CA (US); Felix C. Fernandes, Saratoga, CA (US); Jeffrey J. Irwin, Cupertino, CA (US); Liviu R. Morogan, San Jose, CA (US); Sorin Constantin Cismas, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/476,704

(22) Filed: Sep. 16, 2021

(65) Prior Publication Data

US 2023/0081975 A1    Mar. 16, 2023

(51) Int. Cl.
*H04N 19/436* (2014.01)
*H04N 19/423* (2014.01)

(52) U.S. Cl.
CPC ......... *H04N 19/436* (2014.11); *H04N 19/423* (2014.11)

(58) Field of Classification Search
CPC ..... H04N 19/436; H04N 19/423; H04N 19/12
See application file for complete search history.

(56) References Cited

U.S. PATENT DOCUMENTS

| | | | |
|---|---|---|---|
| 9,106,888 B2 | 8/2015 | Chou | |
| 9,215,472 B2 | 12/2015 | Orr et al. | |
| 9,218,639 B2 | 12/2015 | Cote et al. | |
| 9,224,186 B2 | 12/2015 | Rygh et al. | |
| 9,224,187 B2 | 12/2015 | Cote et al. | |
| 9,270,999 B2 | 2/2016 | Cote et al. | |
| 9,292,899 B2 | 3/2016 | Schaub et al. | |
| 9,299,122 B2 | 3/2016 | Okruhlica et al. | |
| 9,305,325 B2 | 4/2016 | Cheng et al. | |
| 9,336,558 B2 | 5/2016 | Cote et al. | |
| 9,351,003 B2 | 5/2016 | Cote et al. | |
| 9,380,312 B2 | 6/2016 | Cote et al. | |
| 2008/0056358 A1* | 3/2008 | Fuchie | H04N 19/40 375/E7.199 |
| 2011/0206133 A1* | 8/2011 | Hugosson | H04N 19/436 375/E7.2 |
| 2012/0308197 A1* | 12/2012 | Lu | H04N 21/41265 386/E5.028 |
| 2013/0322550 A1* | 12/2013 | Symes | H04N 19/436 375/240.26 |
| 2015/0092833 A1 | 4/2015 | Ku et al. | |
| 2015/0092843 A1 | 4/2015 | Millet et al. | |
| 2015/0092855 A1 | 4/2015 | Chou et al. | |
| 2015/0117536 A1* | 4/2015 | Yu | H04N 19/436 375/240.16 |
| 2015/0146794 A1* | 5/2015 | Hoang | H04N 19/91 375/240.24 |

(Continued)

*Primary Examiner* — Mohammed S Rahaman
(74) *Attorney, Agent, or Firm* — FLETCHER YODER PC

(57) ABSTRACT

Systems and methods of parallel image parsing and processing for video decoding are provided. Video decoder circuitry may enable an incoming encoded bitstream to be split into multiple bitstreams corresponding to the bitstream compression scheme and processed by multiple parsers corresponding to the bitstream compression scheme in parallel. This enables parallel decoding of the incoming bitstream and, thus, more efficient decoder processing.

20 Claims, 6 Drawing Sheets

(56) References Cited

U.S. PATENT DOCUMENTS

| | | | |
|---|---|---|---|
| 2016/0007038 A1 | 1/2016 | Chou et al. | |
| 2016/0007046 A1* | 1/2016 | Chou | H04N 19/13 |
| | | | 375/240.02 |
| 2016/0021385 A1 | 1/2016 | Chou et al. | |
| 2016/0119649 A1* | 4/2016 | Adireddy | H04N 19/61 |
| | | | 375/240.02 |
| 2016/0191935 A1* | 6/2016 | Chao | H04N 19/172 |
| | | | 375/240.25 |
| 2017/0006287 A1* | 1/2017 | Subramanya | H04N 19/103 |
| 2017/0019679 A1* | 1/2017 | Wang | H04N 19/423 |
| 2017/0078704 A1* | 3/2017 | Charmet | H04N 19/156 |
| 2019/0028745 A1* | 1/2019 | Katsavounidis | H04N 19/59 |
| 2021/0258659 A1* | 8/2021 | Hannuksela | H04N 21/8543 |
| 2021/0295583 A1* | 9/2021 | Vaidyanathan | G06T 15/06 |

* cited by examiner

PARALLEL VIDEO PARSING FOR VIDEO DECODER PROCESSING

BACKGROUND

This disclosure relates to systems and methods of parallel video parsing for video decoder processing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

Numerous electronic devices—such as cellular devices, televisions, handheld devices, and notebook computers—often display images and videos on an electronic display. To do this, many electronic devices include image decoding circuitry that parses and processes encoded video data to produce decoded video frames. As images and videos gain increasing resolution and dynamic range, the sizes of encoded bitstreams have also grown, which places an increasing burden on the image decoding circuitry.

SUMMARY

A summary of certain embodiments disclosed herein is set forth below. It should be understood that these aspects are presented to provide the reader with a brief summary of these certain embodiments and that these aspects are not intended to limit the scope of this disclosure.

Parallel decoding may allow images and videos to be quickly and efficiently processed for display on an electronic display. Not only may multiple decoder cores and two parsers operate in parallel, but at least four parsers corresponding to each compression scheme of the encoded bitstreams may also operate in parallel. This may allow an electronic device to parse and decode bitstreams in parallel according to the type of encoding used for the video data, and increase performance to match decoder pipeline performance. Bitstreams may correspond to multiple video compression standards, such as High Efficiency Video coding (HEVC), Advanced Video coding (AVC), and VP9, to name a few. Each bitstream for each type of compression standard may be parsed and decoded independently. Each bitstream contains a variety of syntax elements that may be more and/or less dense and take a variable amount of time for the parsers to process. Since this could create a bottleneck effect at the image decoder pipeline, multiple parsers may parse the syntax elements largely independent of the decoder cores.

Thus, embodiments herein provide various systems and methods to reduce latency and inefficiencies in parallel parsing and processing for video decoding. To do so, embodiments disclosed herein use multiple video parsers corresponding to HEVC compression schemes and AVC compression schemes to parse bitstreams in parallel. Each of four or more parsers may correspond to the same compression scheme to optimize parsing of the encoded bitstreams. For example, the image processing circuitry may include multiple video parsers that receive multiple streams of a bitstream. Multiple computing blocks of the video decoder including multiple video parsers may operate to decode the bitstreams in parallel. The ability to use multiple computing blocks including multiple video parsers may increase the decoding performance while taking up comparatively little space (e.g., increasing performance by up to four times while taking up just double the space). This is because the performance of the video decoder pipeline depends on the instructions decoded by the video parsers; therefore, additional computational units (e.g., video parsers) may be used to increase video processing in parallel and mitigate delays in the video decoder pipeline execution.

Additionally, there may be multiple types of video parsers to parse multiple different video compression formats. For example, the image processing circuitry may include multiple AVC video parsers that parse AVC encoded video data. The image processing circuitry may also include multiple HEVC video parsers that parse HEVC encoded video data. The multiple parsers may parse video bitstreams encoded using multiple slices, multiple tiles, wavefront parallel processing (WPP), or the like. The multiple video parsers may be decoupled from the decoder pipeline to enable the output of the multiple video parsers to be saved to direct memory access (DMA) unit. This may reduce dependencies and latency between the video parsers and the decoder cores.

BRIEF DESCRIPTION OF THE DRAWINGS

Various aspects of this disclosure may be better understood upon reading the following detailed description and upon reference to the drawings described below.

DETAILED DESCRIPTION

Figure 1:
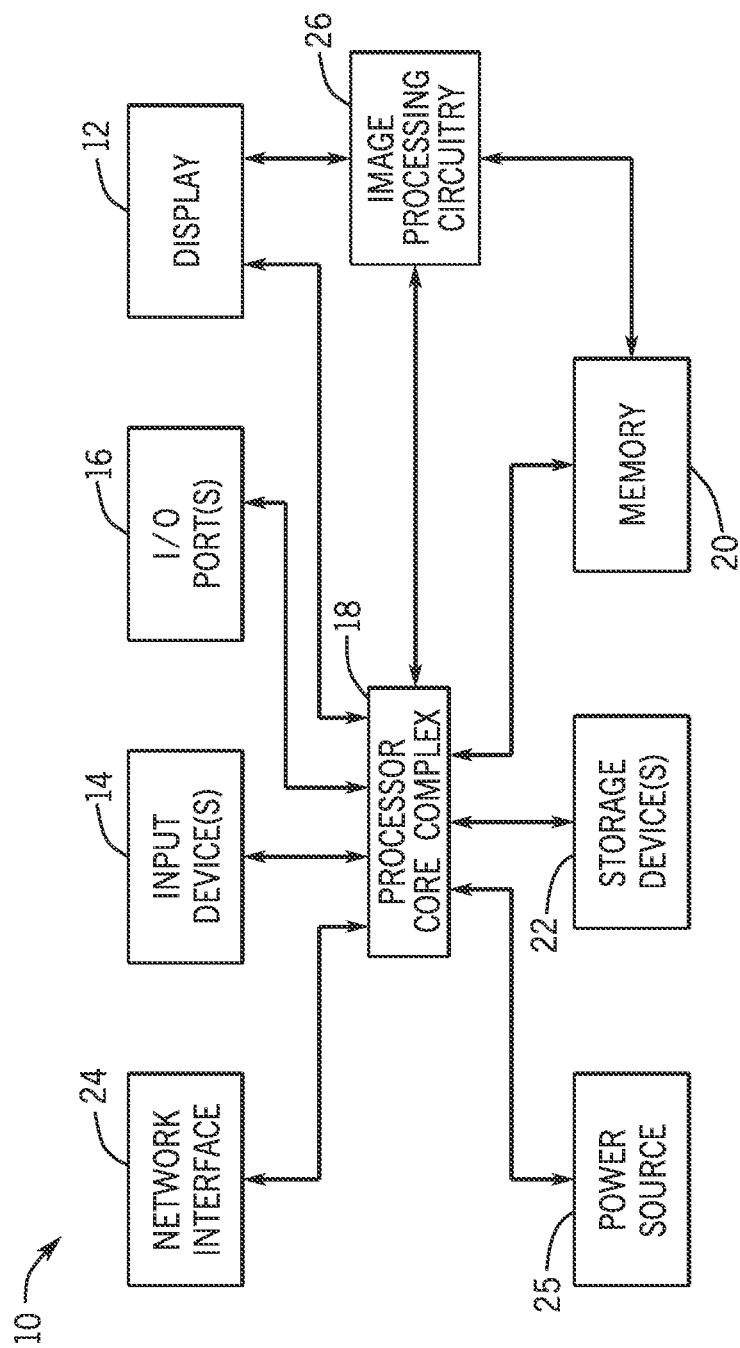
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to parallel decoding of encoded video data (e.g., a bitstream). An electronic device may parse and decode a bitstream in parallel according to the type of encoding used for the video data. The bitstream may correspond to multiple video compression standards including High Efficiency Video coding (HEVC), Advanced Video coding (AVC), and VP9. Each bitstream for each type of compression standard may be parsed and decoded independently. Each bitstream contains a variety of syntax elements that may be more and/or less dense and take longer for the parser to process. Since this could create a bottleneck effect at the image decoder pipeline, multiple parsers may parse the syntax elements largely independent of the decoder cores.

Embodiments herein provide various systems and methods to reduce latency and inefficiencies in parallel parsing and processing for video decoding. To do so, embodiments disclosed herein use multiple video parsers to parse bitstreams in parallel. For example, the image processing circuitry may include multiple video parsers corresponding to the HEVC compression scheme, the AVC compression scheme, and the VP9 compression scheme, that receive multiple streams of a bitstream corresponding to the respective compression scheme.

Each compression scheme may correspond to four video parsers located in the image processing circuitry. Previously, two parsers may have been used for image processing, but as performance of the image decoding circuitry has increased the need for more parsers corresponding to different compression schemes has increased. The multiple computing blocks of the video decoder including multiple video parsers that may operate to decode the bitstreams in parallel. Using multiple computing blocks with four video parsers may increase the decoding performance by up to four times while only taking up two times the space in the video decoder hardware, as compared to merely adding additional Central Processing Units (CPUs). This is because the performance of the video decoder pipeline depends on the instructions decoded by the video parsers; therefore, additional computational units (e.g., video parsers) may be used to increase video processing in parallel and mitigate delays in the video decoder pipeline execution.

Additionally, there may be multiple types of video parsers to parse multiple different video compression formats. For example, the image processing circuitry may include multiple AVC video parsers that parse AVC encoded video data. The image processing circuitry may also include multiple HEVC video parsers that parse HEVC encoded video data. The multiple parsers may parse video bitstreams encoded using multiple slices, multiple tiles, wavefront parallel processing (WPP), or the like. The multiple video parsers may be decoupled from the decoder pipeline to enable the output of the multiple video parsers to be saved to direct memory access (DMA) unit. This may reduce dependencies and latency between the video parsers and the decoder cores.

With this in mind, an example of an electronic device 10 that may benefit from these features is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to an electronic display 12, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and image processing circuitry 26. The various components described in FIG. 1 may include hardware elements (e.g., circuitry), software elements (e.g., a tangible, non-transitory computer-readable medium storing instructions), or a combination of both hardware and software elements. The various components may be combined into fewer components or separated into additional components. For example, the memory 20 and the storage devices 22 may be included in a single component. In another example, the image processing circuitry 26 may be a component of the processor core complex 18, a separate module, or a component of the electronic display 12.

The processor core complex 18 is operably coupled with the memory 20 and the storage device 22. As such, the processor core complex 18 may execute instructions stored in memory 20 and/or a storage device 22 to perform operations, such as generating or processing video data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as video data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., video data) to a communication network and/or receive data from the communication network.

A power supply 25 may provide electrical power to operate the processor core complex 18 and/or other components in the electronic device 10, for example, via one or more power supply rails. Thus, the power supply 25 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as video data, with the portable storage device. The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may display images. For example, the electronic display 12 may display a graphical user interface (GUI) 31 of an operating system, an application interface, text, a still image, or video content. The electronic display 12 may display an image by controlling the luminance of various display pixels based at least in part image data associated with corresponding image pixels in image data. The image data may be generated by an image source, such as the processor core complex 18, a graphics processing unit (GPU), an image sensor, and/or memory 20 or storage 22. Image data may also be received from another electronic device 10 via the network interface 24 and/or an I/O port 16.

Figure 2:
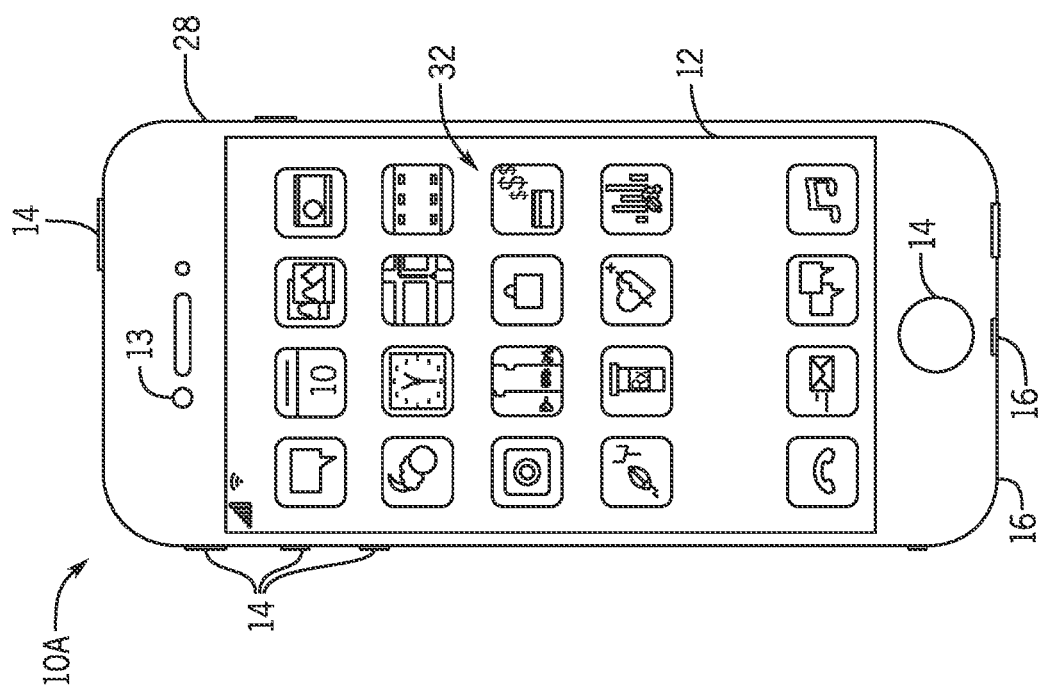
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) having an array of icons 32. By way of example, when an icon 32 is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
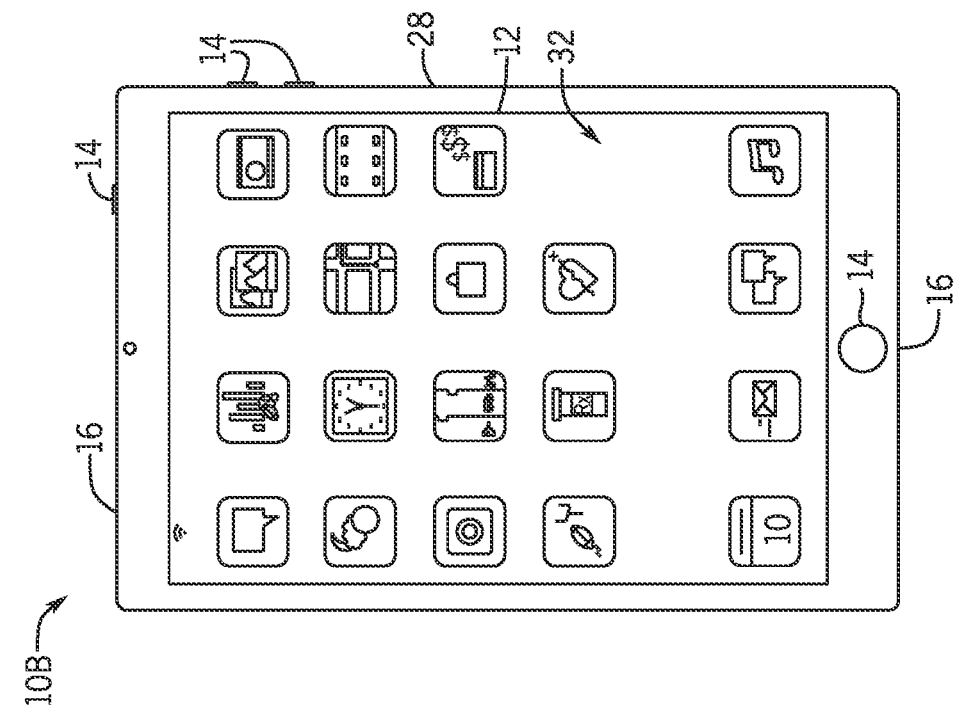
FIG. 3 is a front view of a tablet device representing an example of the electronic device of FIG. 1, in accordance with an embodiment.
Figure 4:
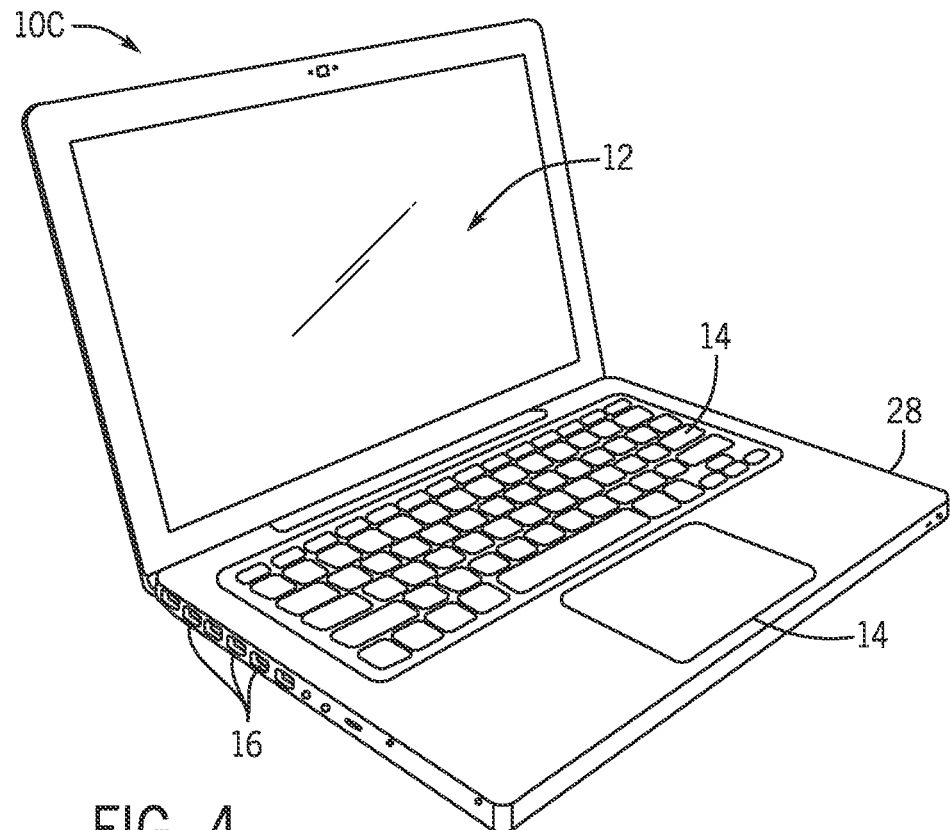
FIG. 4 is a front view of a notebook computer representing an example of the electronic device of FIG. 1, in accordance with an embodiment.
Figure 5:
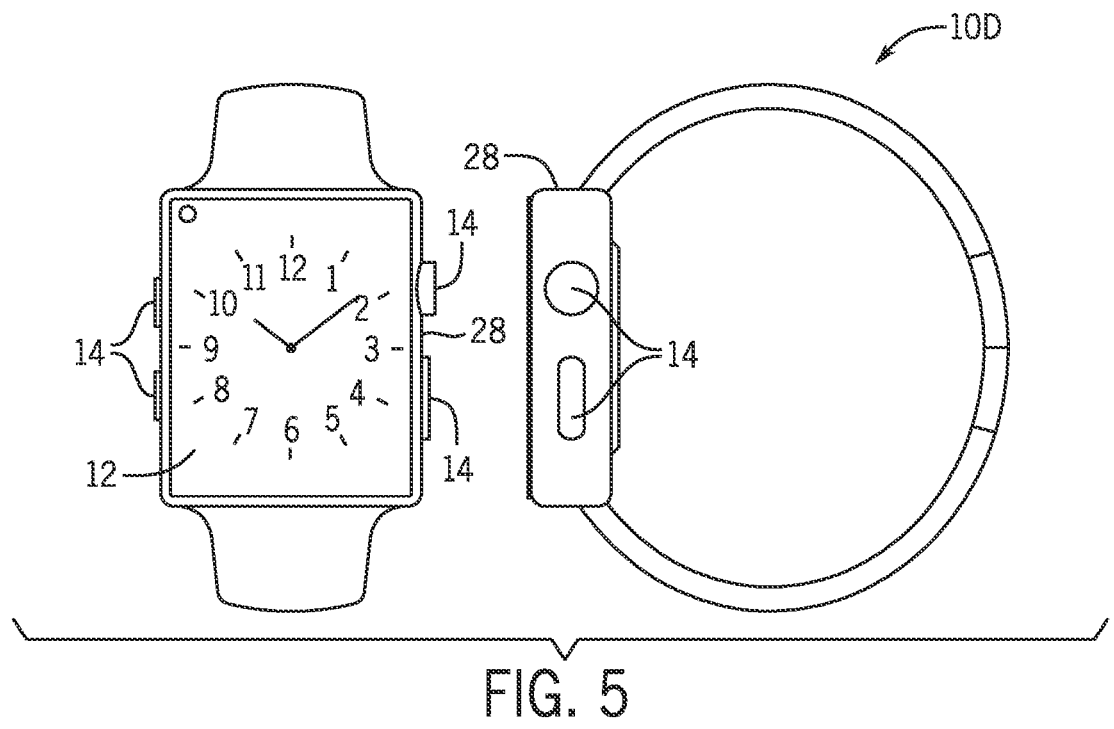
FIG. 5 shows front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Some image data that may be displayed on the electronic display 12 may take the form of an encoded stream of video data. The encoded stream of video data may first be decoded before it can be displayed. Encoded video data may use any suitable compression scheme (e.g., HEVC, AVC, VP9, or the like). The compression scheme used to encode the bitstream may be parsed using a video parser that corresponds to the compression scheme. The bitstream corresponding to each compression scheme may be parsed in parallel and sent to memory to mitigate bottleneck effects that may occur at a decoder pipeline due to latency in the parsing process.

Figure 6:
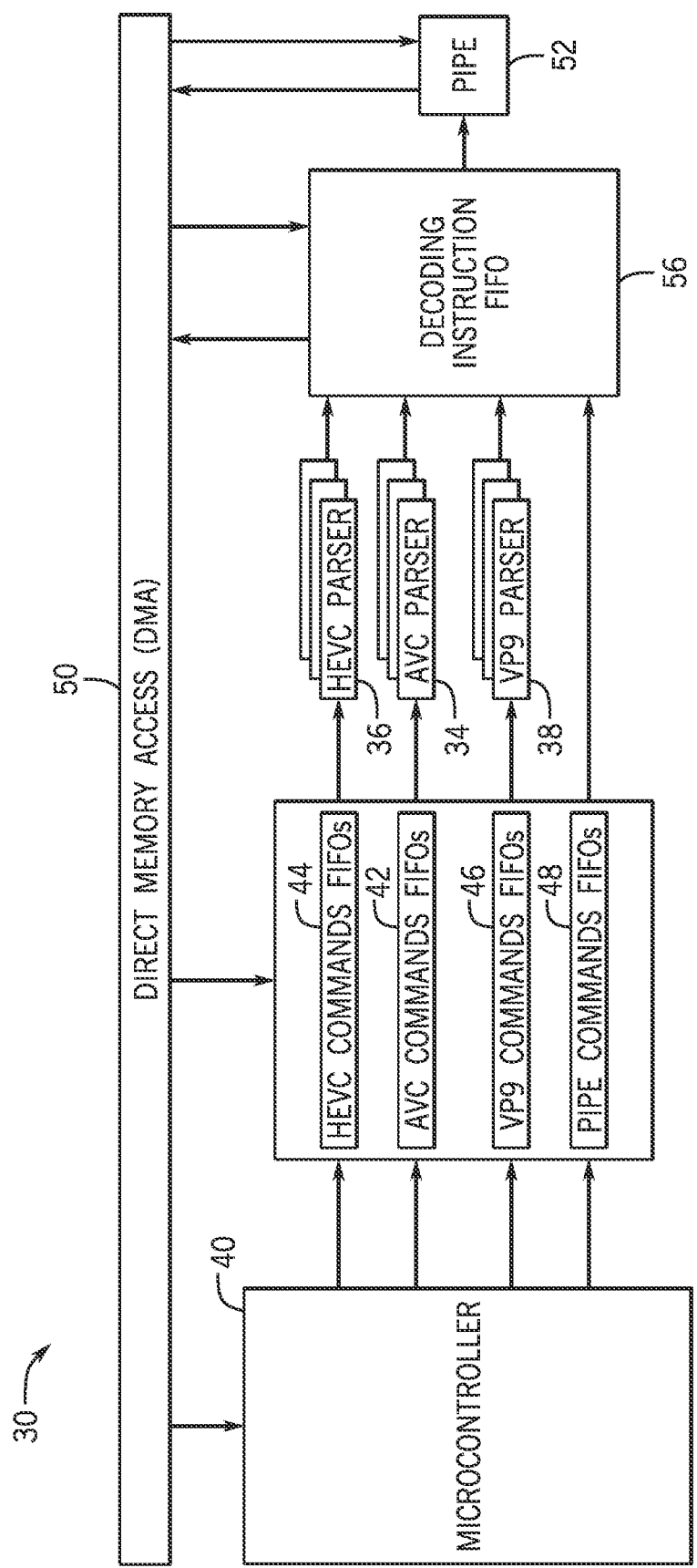
FIG. 6 is a block diagram of video decoder components, in accordance with an embodiment.

With the foregoing in mind, FIG. 6 is a block diagram of a video decoder 30. The video decoder 30 components may include multiple Advanced Video Coding (AVC) (e.g., 2.264) parsers 34 and multiple High Efficiency Video Coding (HEVC) (e.g., 2.265) parsers 36 and a VP9 parser 38 that enables parsing encoded video data (e.g., bitstreams) in parallel to obtain syntax elements and determine instructions corresponding to video data that are passed to and utilized by a decoder pipeline to decode image frames. Splitting and parsing encoded video data in parallel may mitigate inefficiencies due to serial bitstream parsing that could otherwise delay other downstream decoding processes.

The video decoder 30 components may include a microcontroller 40, which may be decoupled from the other hardware components of the video decoder 30 by an AVC command first-in first-out (FIFO) 42, an HEVC command FIFO 44, an VP9 command FIFO 46, and a pipe command FIFO 48. The microcontroller 40 may route to a local control process unit (CPU). The microcontroller 40 may execute firmware that includes hardware units of the video decoder 30, controls scheduling of the bitstream data, and communicates with the main CPU. The microcontroller 40 may receive encoded video data (e.g., bitstreams) that corresponds to a specific compression scheme (e.g., AVC, HEVC, VP9, or the like). The microcontroller 40 may send the encoded video data to the command FIFO that corresponds to the compression scheme of the encoded video data that has been received. For example, video data that corresponds to an HEVC compression scheme will be directed to the HEVC command FIFO 44, which will transfer the encoded video data to the multiple HVEC parsers 36.

A direct memory access (DMA) 50 may be coupled to the microcontroller 40; command FIFOs 42, 44, 46, and 48; a decoder pipeline 52 that will perform video decoding based on the syntax elements extracted by the video parsers 34, 36, and 38 in accordance with instructions from the command FIFO 48; and a decoding instructions FIFO 56. The DMA 50 may receive or transfer the encoded video data or the parsed video data for loading into the decoder pipeline 52 or any of the command FIFOs 42, 44, 46, or 48 and decoding instruction FIFO 56.

The video decoder 30 includes multiple parsers that correspond to multiple compression schemes for video encoding. The video decoder 30 may include any suitable numbers of video parsers required for decoding of encoded video data. For example, the number of HEVC parsers 36 and AVC video parsers 34 for the video decoder 30 may correspond to two, three, four, five, six, seven, or eight HEVC video parsers 36 and two, three, four, five, six, seven, or eight AVC video parsers, or any other suitable number of parsers for video decoding. The number of HEVC parsers 36 and AVC video parsers 34 may be equal or may differ. By way of example, the HEVC video parsers 36 or any other suitable video parser may parse an incoming encoded bitstream for syntax elements and syntax headers that can be used by the video decoder pipeline 52 to reconstruct the image frames that are encoded in the one or more incoming bitstreams. The bitstreams may be directed to multiple video parsers based on how the bitstream is encoded. For example, if the bitstream was encoded utilizing tiles the tiles may each be scheduled to a parser individually based on the number of available parsers. The first tile of the encoded image frame may be sent to a first parser, and the second tile of the encoded image frame may be directed to a second parser and so on for each available parser of the video decoder 30. The tiles may each correspond to the video compression format used to encode the video data. For example, image frame tiles encoded according to the HEVC compression standard may each be scheduled to each of the HEVC video parsers 36. It should be understood that any suitable scheduling method to the multiple parsers may be implemented depending on the compression format of the encoded video data.

The video parsers 34, 36, or 38 may direct parsed video data to the DMA 50 for buffering until a suitable amount of the bitstream has been parsed or a suitable number of frames of video data have been parsed by the video parsers 34, 36, or 38. This may mitigate bottleneck effects that can occur by directing the parsed data directly to the decoder pipeline 52. This is because the compressed bitstreams may include different syntax elements depending on the compression scheme which may affect parsing time for the parsers. The ability to store the parsed data in DMA 50 may mitigate the bottleneck problem at the video parsing process and direct the data to the decoder pipeline 52 when a suitable amount of video data has been parsed. The DMA 50 may be circuitry that interfaces with memory (e.g., the memory 20 or the storage device(s) 22 shown in FIG. 1) and/or a memory element of the CPU.

The decoder pipeline may function to decode HEVC bitstreams up to 1 gigabits per second (Gbps), independent of how the bitstream was encoded. For bitstreams encoded with Waveform Parallel Processing (WPP), multiple tiles, or multiple slices, the video decoder 30 may decode HEVC compressed bitstream up to 4 Gbps by using four video HEVC video parsers 36 in parallel. The video parsers 34, 36, and 38 may be completely independent modules and the firmware included in the microcontroller 40 may determine the bitstreams divisions prior to the bitstreams being sent to the video parsers. Based on the compression scheme used for encoding the bitstream, the video parsers 34, 36, and 38 may decode each image frame using a single parser 34, 36, or 38 to decode multiple image frames in parallel. In other embodiments, the video parsers 34, 36, and 38, depending on the compression format, may be able to decode the same image frame using multiple video parsers 34, 36, or 38 in parallel. It should be understood that depending on the compression format, the multiple HEVC video parsers 36 and the multiple AVC video parsers 34 may decode individual image frames or multiple image frames in parallel using the divided encoded bitstream data.

As discussed above, the one or more video parsers 34, 36, and 38 corresponding to each compression scheme may receive encoded bitstreams and parse the bitstreams to develop syntax information and instructions for the decoder pipeline 52. The decoder pipeline 52 may receive the parsed bitstream data and may decode coding tree units (CTUs) of the bitstream according to the syntax instructions determined from the parsed bitstream data. The CTUs may vary depending on the compression scheme of the bitstream. For example, for an HEVC video compression scheme, the CTUs may have a block structure of 64×64 pixels, 32×32 pixels, or 16×16 pixels. For AVC video compression schemes, the CTUs may be a 16×16 macroblock, and for VP9 video compression scheme, the CTUs may be a 64×64 superblock.

The separation of the multiple video parsers 34, 36, and 38 according to compression scheme enables the decoding instruction FIFOs 56 to smooth out the bottlenecks in the parsing output of the syntax elements and instructions such that the decoder pipeline 52 may process the image frames in the correct state and/or order without latency. The bitstream syntax may employ any combination of syntax elements and categories, such that the video data can be decoded according to the decoder capabilities.

Figure 7:
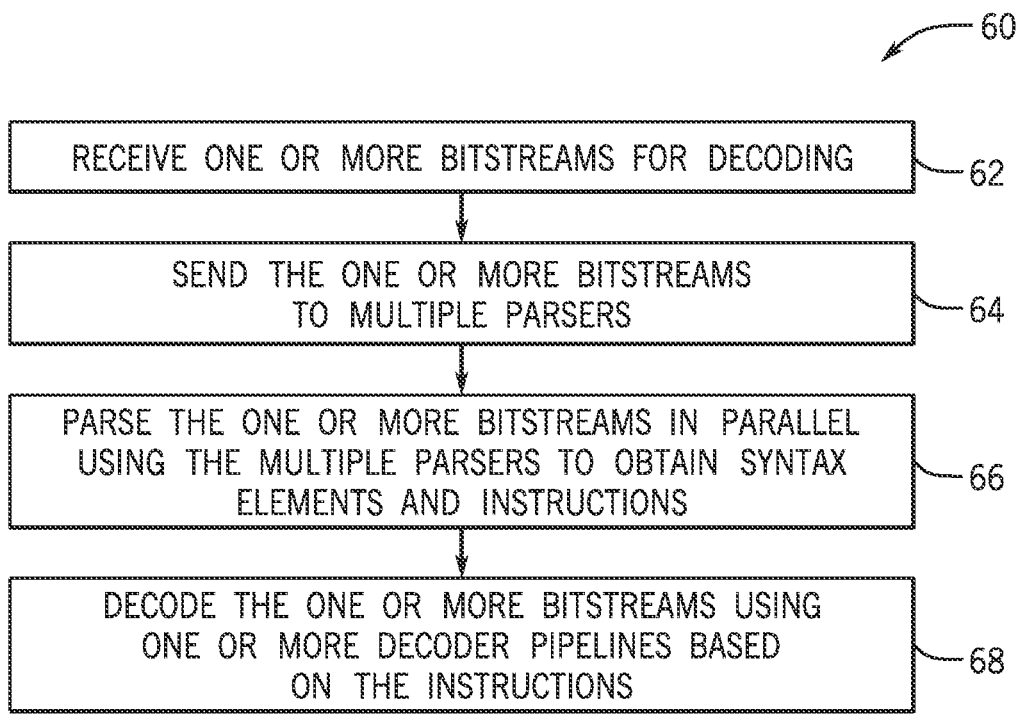
FIG. 7 is a flow diagram of parallel parsing and video decoding, in accordance with an embodiment.

With the foregoing in mind, FIG. 7 is a flow diagram of a method 60 of parallel parsing and video decoding, in accordance with an embodiment. As discussed above, multiple video parsers corresponding to one or more compression schemes may be used to parse bitstreams in parallel so that the bitstreams may be parsed and the instructions sent to the decoder pipeline 52 more efficiently.

The video decoder 30 of the image processing circuitry 26 may divide an incoming bitstream into one or more streams and direct the divided streams to the one or more video parsers. Any suitable device (e.g., the microcontroller 40) that may control components of the electronic device 10, such as the processor 18 (e.g., processor core complex 18), may perform the method 60. In some embodiments, the method 60 may be implemented by executing instructions stored in a tangible, non-transitory, computer-readable medium, such as the memory (e.g., DMA 50), using the processor core complex 18. For example, the method 90 may be performed at least in part by one or more software components, such as an operating system of the electronic device 10, one or more software applications of the electronic device 10, and the like. While the method 60 is described using steps in a specific sequence, it should be understood that the present disclosure contemplates that the described steps may be performed in different sequences than the sequence illustrated, and certain described steps may be skipped or not performed altogether.

In process block 62, the processor 18 may divide the incoming bitstream into multiple streams and direct the multiple streams to the multiple video parsers. The multiple streams may be directed to the multiple video parsers based on the compression scheme of the encoded bitstream. For example, the incoming encoded bitstream may have been encoded using a specific compression scheme. In an example where there are four video parsers corresponding to that specific compression scheme, the encoded bitstream may be divided into four equal streams and each of the four equal streams, in process block 64, may be sent to the four video parsers that correspond to the specific compression scheme used to encode the bitstream. The encoded bitstream may be split into any suitable number of streams to correspond to the number of video parsers included in the video decoder 30 for that compression scheme. In some cases, the encoded bitstream may be split equally between the video parsers, while in other cases, encoded bitstream may be split based on a current rate of processing by the video parsers. In another example, the number of video parsers that are used may vary depending on a desired throughput. For instance, at a first throughput, one video parser may be used for the entire bitstream; at a second throughput higher than the first, half of the video parsers may be used; and at a third throughput higher than the second, all of the video parsers may be used.

In process block 66, each of the multiple video parsers corresponding to the compression scheme of the bitstreams may decode the encoded bitstreams in parallel to determine syntax elements and syntax headers that can be used by the video decoder pipeline 52 to reconstruct the image frames that are encoded in the one or more incoming bitstreams. The video parsers may receive bitstream data that corresponds to the same image frame and/or multiple image frames for parallel decoding of the image frames. The decoded bitstream data including the decoding instructions based on the identified syntax elements may then be sent, at process block 68, to the decoder pipeline 52 for further processing to enable the video frames to be reconstructed and/or sent to a memory buffer to be stored for decoder pipeline 52 processing at a later time.

Figure 8:
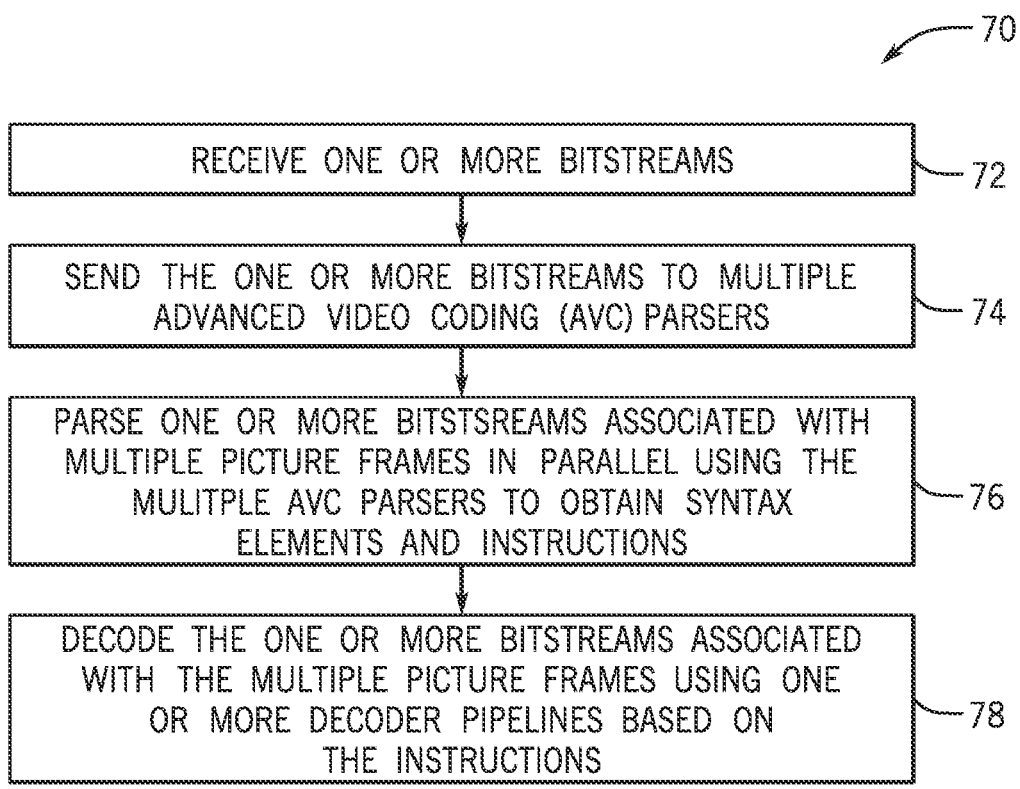
FIG. 8 is a block diagram of the parallel parsing and video decoding for an Advanced Video Coding (AVC) compression scheme, in accordance with an embodiment.

As discussed above, the bitstreams may be encoded using multiple types of video compression schemes (e.g., HEVC, AVC, and VP9). Each of the video compression schemes may require video parsers that are specific to the compression scheme, and may be able to decode one and/or multiple image frames in parallel according to the video parser capabilities as related to the compression scheme With the foregoing in mind, FIG. 8 is a flow diagram of a method 70 of parallel parsing and video decoding using AVC video parsers, in accordance with an embodiment. As discussed above multiple video parsers corresponding to one or more compression schemes may be used to parse bitstreams in parallel so that the bitstreams may be parsed and the instructions sent to the decoder pipeline 52 more efficiently.

The video decoder 30 of the image processing circuitry 26 may divide an incoming bitstream into one or more streams to direct to one or more video parsers. Any suitable device (e.g., the microcontroller 40) that may control components of the electronic device 10, such as the processor 18, may perform the method 70. In some embodiments, the method 70 may be implemented by executing instructions stored in a tangible, non-transitory, computer-readable medium, such as the memory (e.g., DMA 50), using the processor 18. For example, the method 70 may be performed at least in part by one or more software components, such as an operating system of the electronic device 10, one or more software applications of the electronic device 10, and the like. While the method 70 is described using steps in a specific sequence, it should be understood that the present disclosure contemplates that the described steps may be performed in different sequences than the sequence illustrated, and certain described steps may be skipped or not performed altogether.

In process block 72, the processor 18 may divide the incoming bitstream into multiple streams and direct the multiple streams to the multiple video parsers. The multiple streams may be directed to the multiple video parsers based on the compression scheme of the encoded bitstream. For example, the incoming encoded bitstream may have been encoded using an AVC compression scheme. The encoded bitstream may be divided into four equal streams and each of the four equal streams, and in process block 74, may be sent to four AVC video parsers 34. The four equal streams may correspond to different encoded pictures. It should be understood that the encoded bitstream may be split into any suitable number of streams to correspond to the number of video parsers included in the video decoder 30 for the compression scheme In process block 76 each of the AVC video parsers 34 may decode the encoded bitstreams in parallel to determine syntax elements and syntax headers that can be used to determine instructions that enable the video decoder pipeline 52 to reconstruct the image frames that are encoded in the one or more incoming bitstreams. The AVC video parsers may receive bitstream data that corresponds to the same multiple picture frames for parallel decoding of the multiple picture frames. The decoded bitstream data may then be sent to the decoder pipeline 52, at process block 78, for further processing using the instructions to enable the video picture frames to be reconstructed and/or sent to a memory buffer to be stored for decoder pipeline 52 processing at a later time.

Figure 9:
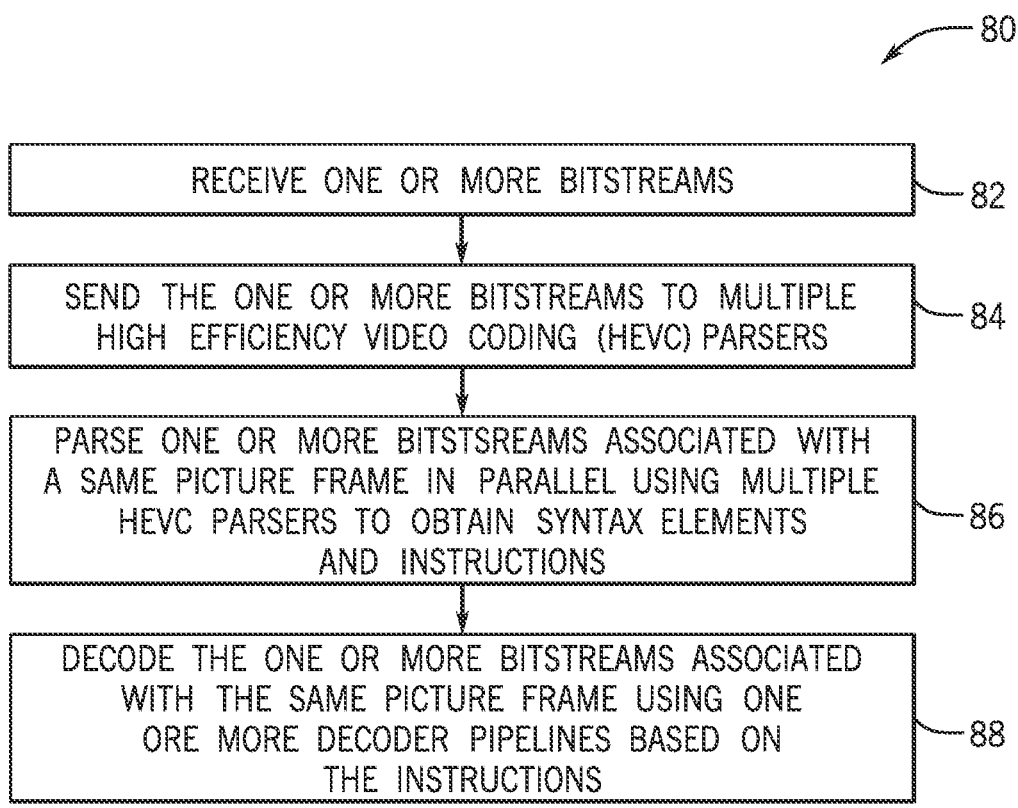
FIG. 9 is a flow diagram of parallel parsing and video decoding for a High Efficiency Video Coding (HEVC) compression scheme, in accordance with an embodiment.

Based on the above, FIG. 9 is a flow diagram of a method 80 of parallel parsing and video decoding using HEVC video parsers, in accordance with an embodiment. As discussed above multiple video parsers corresponding to one or more compression schemes may be used parse bitstreams in parallel so that the bitstreams may be parsed and the instructions sent to the decoder pipeline 52 more efficiently.

The video decoder 30 of the image processing circuitry 26 may determine divide an incoming bitstream into one or more streams to direct to one or more video parsers. Any suitable device (e.g., the microcontroller 40) that may control components of the electronic device 10, such as the processor 18, may perform the method 80. In some embodiments, the method 70 may be implemented by executing instructions stored in a tangible, non-transitory, computer-readable medium, such as the memory (e.g., DMA 50), using the processor 18. For example, the method 80 may be performed at least in part by one or more software components, such as an operating system of the electronic device 10, one or more software applications of the electronic device 10, and the like. While the method 80 is described using steps in a specific sequence, it should be understood that the present disclosure contemplates that the described steps may be performed in different sequences than the sequence illustrated, and certain described steps may be skipped or not performed altogether.

In process block 82, the processor 18 may divide the incoming bitstream into multiple streams and direct the multiple streams to the multiple video parsers. The multiple streams may be directed to the multiple video parsers based on the compression scheme of the encoded bitstream. For example, the incoming encoded bitstream may have been encoded using an HEVC compression scheme. The encoded bitstream may be divided into equal streams in any number to correspond to the number of parsers present in the video hardware 30 for the associated compression scheme.

In process block 84, the equal streams may be sent to four HEVC video parsers 36. It should be understood that any suitable number of HEVC video parsers 36 may be implemented for the video hardware 30. The four equal streams may correspond to different encoded pictures. It should be understood that the encoded bitstream may be split into any suitable number of streams to correspond to the number of video parsers included in the video decoder 30 for the compression scheme In process block 86 each of the HEVC video parsers 36 may decode the encoded bitstreams in parallel. The HEVC video parsers may receive bitstream data that corresponds to the same HEVC picture for parallel decoding of the same picture frame. Further, if the HEVC bitstream was encoded using WPP, an even number HEVC parsers may decode alternate coding tree unit (CTU) rows within an encoded image tile. In the case the HEVC bitstream was encoded with multiple tiles the HEVCs parsers may decode different tiles. The HEVC parser may also decode different independent slices of the bitstream if the bitstream was encoded with multiple independent slices.

The decoded bitstream data, decoded using any of the methods mentioned above according to encoding structure may be sent for further processing. At process block 88, the instructions determined by the HEVC parser may then be sent to the decoder pipeline 52. The decoder pipeline 52 may perform further processing to enable the video picture frames to be reconstructed and/or the instructions determined by the HEVC parser may be sent to a memory buffer to be stored for decoder pipeline 52 processing at a later time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising decoder hardware, wherein the decoder hardware comprises:
a first plurality of video parsers corresponding to a High Efficiency Video Coding (HEVC) compression scheme and a second plurality of video parsers corresponding to an Advanced Video Coding (AVC) compression scheme, wherein the first plurality of video parsers are decoupled from and are greater in number than a decoder pipeline in the decoder hardware and the second plurality of video parsers are decoupled from and are greater in number than the decoder pipeline in the decoder hardware, and wherein the first plurality of video parsers and the second plurality of video parsers are configured to:
receive a plurality of streams of an encoded bitstream at the first plurality of video parsers or the second plurality of video parsers corresponding to the compression scheme of the encoded bitstream, wherein the encoded bitstream is divided into the plurality of streams to correspond to the first plurality of video parsers or the second plurality of video parsers; and
parse the plurality of the streams of the encoded bitstream in parallel at the first plurality of video parsers or the second plurality of video parsers; and
the decoder pipeline, wherein the decoder pipeline on is configured to receive the parsed bitstreams parsed by the first plurality of video parsers or the second plurality of video parsers and use the parsed bitstreams to decode one or more image frames based on the parsed bitstreams.

2. The electronic device of claim 1, wherein the first plurality of video parsers corresponding to the HEVC compression scheme are configured to receive one or more streams of the plurality of streams corresponding to a same image frame of the encoded bitstream.

3. The electronic device of claim 2, wherein the first plurality of video parsers corresponding to the HEVC compression scheme are configured to parse one or more streams of the plurality of streams in parallel, and send the parsed bitstream of a single frame to a decoding instruction first in first out (FIFO) component of the decoder hardware.

4. The electronic device of claim 1, wherein the first plurality of video parsers or the second plurality of video parsers are configured to send the parsed bitstream to a direct memory access (DMA).

5. The electronic device of claim 1, wherein the second plurality of video parsers corresponding to the AVC compression scheme are configured to receive one or more streams of the plurality of streams, wherein each stream of the one or more streams of the plurality of streams corresponds to an image frame of the encoded bitstream.

6. An electronic device comprising:
memory or storage configured to store an encoded bitstream of video data encoded according to a video compression scheme;
an electronic display configured to display the video data after the video data has been decoded into decoded video data; and
video decoder circuitry configured to decode the encoded bitstream to obtain the decoded video data, wherein the video decoder circuitry comprises:
a first plurality of video parsers corresponding to a High Efficiency Video Coding (HEVC) compression scheme and a second plurality of video parsers corresponding to an Advanced Video Coding (AVC) compression scheme, wherein the first plurality of video parsers or the second plurality of video parsers are configured to parse different parts of the encoded bitstream in parallel to obtain syntax elements, wherein the parsed encoded bitstream is sent to a direct memory access (DMA), and wherein the parsed encoded bitstream is retrieved from the DMA by one or more processor cores; and
a video decoder pipeline comprising the one or more processor cores, wherein the video decoder pipeline is configured to use the syntax elements to obtain the decoded video data, and wherein the video decoder circuitry has more video parsers than video decoder pipelines.

7. The electronic device of claim 6, wherein the first plurality of video parsers comprises a plurality of HEVC video parsers configured to parse different parts of a same picture of the encoded bitstream.

8. The electronic device of claim 6, wherein the encoded bitstreams are parsed in parallel at the first plurality of video parsers or the second plurality of video parsers and multiplexed into the same video decoder pipeline.

9. The electronic device of claim 6, wherein the first plurality of video parsers comprises a plurality of HEVC video parsers configured to decode different independent slices of the encoded bitstream.

10. The electronic device of claim 6, wherein the second plurality of video parsers comprises a plurality of AVC video parsers configured to decode multiple pictures of the encoded bitstream in parallel.

11. The electronic device of claim 6, wherein the first plurality of video parsers comprises at least four HEVC video parsers and the second plurality of video parsers comprises at least four AVC video parsers.

12. The electronic device of claim 11, wherein the first plurality of the video parsers and the second plurality of the video parsers are respectively configured to decode up to 4 Gigabits per second (Gbps) in parallel.

13. The electronic device of claim 6, wherein the first plurality of video parsers or the second plurality of video parsers receive different parts of the encoded bitstream that includes at least a 64×64 pixel coding tree unit (CTU).

14. The electronic device of claim 6, wherein the second plurality of video parsers corresponding to the AVC compression scheme receive an AVC encoded bitstream that includes at least a 16×16 macroblock coding tree unit (CTU).

15. An article of manufacture comprising one or more tangible, non-transitory, machine-readable media comprising instructions that, when executed by a processor, cause video decoding circuitry to perform operations comprising:

receiving, at a first plurality of video parsers corresponding to High Efficiency Video Coding (HEVC) and a second plurality of video parsers corresponding to Advanced Video Coding (AVC), a plurality of streams divided from an encoded bitstream of video data encoded according to a video compression scheme;

parsing syntax elements of the plurality of streams of the encoded bitstream in parallel at the first plurality of video parsers or the second plurality of video parsers to obtain parsed bitstreams, wherein the first plurality of video parsers and the second plurality of video parsers are decoupled from one or more decoder pipelines of the video decoding circuitry; and sending the parsed bitstreams to a memory associated with the video decoding circuitry; and decoding, using a decoder pipeline of the one or more video decoder pipelines of the video decoding circuitry, wherein the video decoding circuitry comprises fewer video decoder pipelines than the first plurality of video parsers or the second plurality of video parsers, the encoded video data to obtain decoded video data using the parsed bitstreams.

16. The article of manufacture of claim 15, wherein the encoded bitstream comprises variable-length coded syntax elements.

17. The article of manufacture of claim 15, wherein the encoded bitstream comprises luma and chroma color data.

18. The electronic device of claim 6, wherein at least two of the different parts of the encoded bitstream correspond to different image frames.

19. The article of manufacture of claim 15, wherein at least two of the plurality of streams of the encoded bitstream correspond to different image frames.

20. The electronic device of claim 1, wherein the decoder hardware comprises a first plurality of command first-in-first-out memories (FIFOs) corresponding to HEVC commands and a second plurality of command first-in-first-out memories (FIFOs) corresponding to AVC.

* * * * *

UNITED STATES PATENT AND TRADEMARK OFFICE
CERTIFICATE OF CORRECTION

PATENT NO. : 11,778,211 B2
APPLICATION NO. : 17/476704
DATED : October 3, 2023
INVENTOR(S) : Yaxiong Zhou et al.

It is certified that error appears in the above-identified patent and that said Letters Patent is hereby corrected as shown below:

In the Claims

Column 12, Claim 1, Line 14, delete the word "on".

Signed and Sealed this
Twenty-third Day of April, 2024

Katherine Kelly Vidal
*Director of the United States Patent and Trademark Office*